Patented May 13, 1952

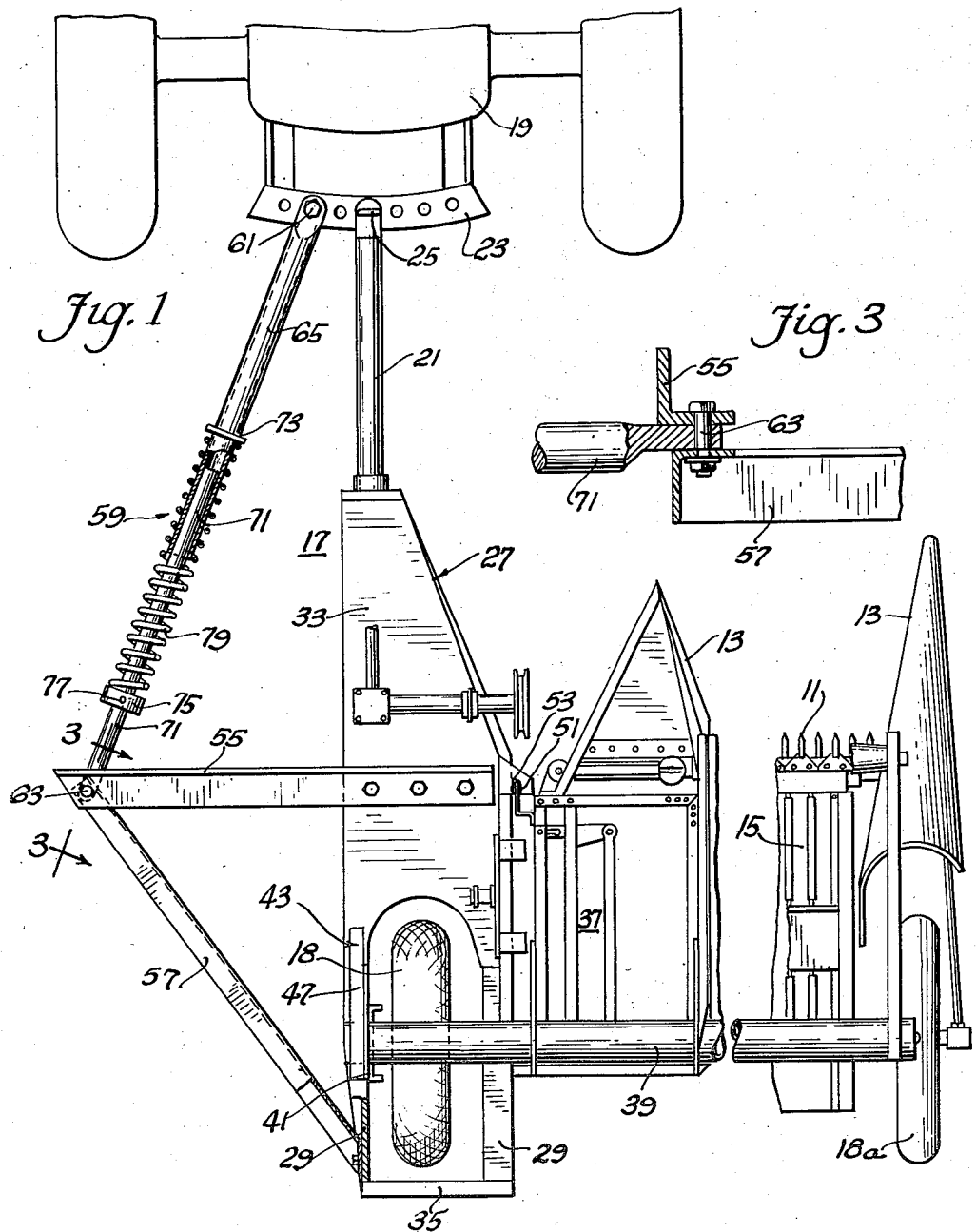

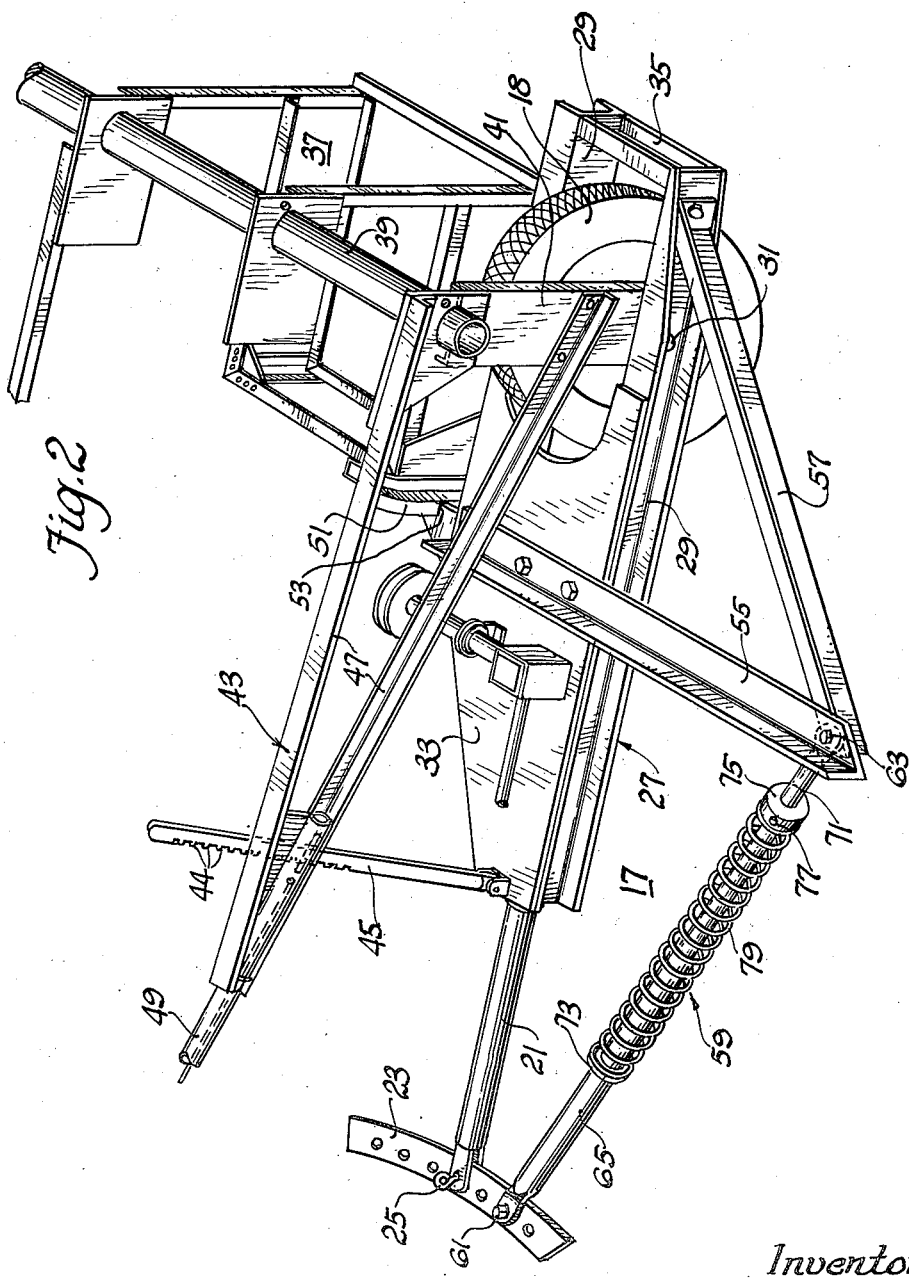

2,596,902

UNITED STATES PATENT OFFICE 2,596,902

DRAFT FRAME

Norman R. Krause, Racine, Wis., assignor to J. I. Case Company, Racine, Wis., a corporation of Wisconsin Application April 7, 1948, Serial No. 19,521

2 Claims. (Cl. 280—33.4)

1

The present invention relates to an improved draft frame and, in particular, to an improved offset draft frame, for mobile, pull-type farm implements, such as harvesters, windrowers, and the like, which have their major dimensions normal to the line of draft and which are connected to a draft vehicle at one end.

The crop engaging means in pull type implements of the class described, as for example windrowers and the like, is disposed behind and to one side of the tractor or other draft vehicle with which the implement is used so that the draft vehicle does not traverse uncut or unprocessed crop material. As the width of the crop engaging means on the implement is increased, the outer support wheel, the wheel which moves in the uncut crop, is subjected to increased stress and tends to drag behind the inner support wheel, which is normally located behind the tractor. This makes it extremely difficult to handle the implement in the field because the support wheels are not aligned in the direction of movement of the implement.

In most farm implements of this general type some of the moving elements are driven from a source of power such as a power take-off shaft or a separate engine, and the remaining elements are driven in relation to the ground speed of the implement through an operative connection to one of the supporting wheels. When such an implement moves out of line with its associated draft vehicle, the power driven elements and the ground wheel driven elements become unsynchronized, and this greatly impairs the efficiency of the harvesting operation.

The object of the present invention is to provide an offset draft means which will maintain an implement of the class described in proper alignment with its associated draft vehicle. A specific object of the invention is to provide a draft frame which is rigid in a horizontal plane so as not to "jack-knife" upwardly or downwardly. A further object of the invention is the provision of an improved draft frame for windrowers and like apparatus having a wide crop engaging means which will overcome the deficiencies of the prior art structures. Other objects and advantages of the invention will be made apparent in the following description and the accompanying drawings of one preferred embodiment thereof. In the drawings:

Fig. 1 is a fragmentary plan view of a windrower having a draft frame in accordance with the invention;

Fig. 2 is a perspective view of the draft frame illustrated in Fig. 1; and

2

Fig. 3 is a view taken on line 3—3 in Fig. 1.

While the improved draft frame of the present invention may be used with advantages in connection with various types of implements, it has particular utility in connection with a wide windrower, such as is illustrated in the drawings. This windrower includes a cutter bar 11 which is disposed normal to the line of draft of the implement, a pair of suitable divider points 13, and a transversely moving draper or endless conveyor 15 which is adapted to move the cut crop transversely away from the uncut crop and to deposit it upon the ground in a windrow. Means are also provided to effect the adjustable positioning of the cutter bar 11 relative to the ground so that varying crop materials can be windrowed. The implement is supported upon suitable support wheels 18 and 18a and a draft frame 17 connects one side of the implement to a tractor 19 or other draft vehicle.

The draft frame 17 in accordance with the invention includes a forwardly extending, tubular draw bar 21 whose forward end is adapted to be connected to the draft bar 23 on the tractor 19 by means of a suitable hitch pin 25. The rearward end of the tubular draw bar is rigidly attached to a box-like section 27 fabricated from suitable structural sections which include a pair of spaced-apart, channel-shaped, side members 29 extending rearwardly from the tubular draw bar 21. Thus, the rigidly interconnected tubular draw bar 21 and box-like frame section 27 comprise a rigid framework which extends longitudinally of the line of draft of the implement. One of the support wheels 18 is rotatably journalled on an axle 31 which extends between the side members 29. The tubular draw bar 21 and the box section 27 form an integral, rigid unit which extends from the tractor to the rearward end of the implement. In order to provide additional rigidity for the box section 27, a connecting plate or web 33 is integrally attached across the upper surfaces of the side members 29. A cross member 35 is attached between the rearward ends of the side members 29 to space them apart and to strengthen the entire structure.

The windrower elements are all supported upon a sub-frame 37 whose inner end is pivotally connected to the draft frame 17 and whose outer end is supported upon the wheel 18a. The sub-frame 37 includes a transversely extending tubular member 39, the inner end of which is rigidly attached to the upper end of a vertically extending channel 41. The lower end of the vertically extending channel 41 rotatively engages the axle 31. Relative adjustment of the windrower elements relative to the ground is provided by a forwardly extending adjusting lever 43 which selectively engages one of a plurality of notches 44 in a positioning link 45 attached to the draft frame 17. In the embodiment of the invention illustrated, the adjusting lever 43 includes a two-member rearward section 47 which merges into a single member 49 that extends to a position over the forward end of the draft frame 17. When the operator desires to change the height at which the cutter bar 11 is severing the grain from the stalk, he merely changes the position of the entire windrower sub-frame 37 relative to the draft frame 17.

A second connection between the draft frame 17 and the windrower sub-frame 37 is effected by an arcuate bearing member 51 on the sub-frame 37 which is slidably engaged in a vertically extending slot 53 in the draft frame 17. The second connection, the arcuate bearing member 51 in the slot 53, is desirably spaced well forward of the tubular member 39 so that maximum rigidity is obtained.

In order to counteract the turning moment which results when the implement is pulled through the field, an outwardly extending member 55 is rigidly attached to the box-like section 27 of the draft frame 17. The outwardly extending member 55 is positioned forwardly of the support wheels, and extends outwardly from the side of the frame opposite the windrower elements. The outer end of the member 55 is connected to the rearward portion of the box section 27 by means of a suitable compression resisting strut 57. A longitudinally extensible member 59 is disposed between the draft bar 23 on the tractor and the point of connection between the strut 57 and the outwardly extending member 55. The forward end of the extensible member 59 is attached to the draft bar 23 at a point spaced from the draw bar connection by a suitable hitch pin or bolt 61, and the rearward end of the extensible member 59 is hingedly attached to the outwardly extending member 55 and the strut 57 by means of a vertically extending bolt 63 or the like.

The longitudinally extensible member 59 comprises a tubular section 65 within which there is slidably supported a smaller tubular section or rod 71. A collar 73 is fixedly attached to the larger tubular section 65 and a similar collar 75 is attached to the rod 71 by a set screw 77 or the like so that the collar may be axially positionable along the rod. A compression spring 79 is disposed between the collars 73 and 75 and its compressive force is adjusted by positioning the collar 75 on the rod 71.

When it is desired to connect the implement to the tractor 19, the forwardly extending draw bar 21 on the draft frame 17 is attached to the draft bar 23 of the tractor 19. The tractor 19 is then pulled forward and turned sharply towards the outer or cutter bar side of the implement. The extensible member 59 is then connected to the draft bar 23 at a point which is spaced from the point at which the draw bar 21 is attached to the draft bar 23. The collar 75 on the rod 71 is then positioned on that rod so that the compression spring 79 is under a slight pressure. The tractor 19 may then be straightened out, and the force of the spring 79 will thereby be increased a sufficient amount to counteract rearward movement of the outer end of the windrower. It is obvious that the pressure exerted by the longitudinally extensible member can be varied by changing the point at which the extensible member is connected to the tractor.

During the operation of an implement having a draft frame in accordance with the invention, the resiliently biased connection which resists the turning moment applied to the frame by the resistance of the outer wheel, facilitates the operation of the implement and the steering of the tractor, in addition to reducing the stresses in the frame members. Particular importance is attached to the rigid, unitary structure of the draft frame from the extreme forward or draw bar end to the extreme rearward end. This feature together with the vertical pin connection between the longitudinally extensible member and the outwardly extending member results in improved handling qualities of the implement in the field.

The features of the invention believed to be new are set forth in the appended claims.

I claim:

1. In a pull type implement having a transversely extending crop engaging means which is supported at its outer end by a support wheel, a draft frame which is adapted to connect the inner end of said implement to an associated draft vehicle, and to support that end of said implement, said draft frame comprising a rigid longitudinally extending framework unit, the forward end of said unit including a longitudinally extending draw bar section and the rearward end of said unit including means defining a rigid, box-like section, said draw bar section and said box-like section being rigidly interconnected to constitute a unitary structure, said draw bar section having a draft connection at its forward end for engaging a point on the draft vehicle, a support wheel journalled on said box-like section adjacent its rearward end, a transversely extending member having its inner end fixedly attached to said box-like section forwardly of said support wheel, a longitudinally extensible member connecting the outer end of said transversely extending member to a point on the draft vehicle which is spaced from the point of connection of said draw bar and said draft vehicle, said connection between said transversely extending member and said longitudinally extensible member including a vertically extending pivot pin connection which permits relative hinged movement between said transversely extending member and said longitudinally extensible member in a horizontal plane, and resilient means associated with said longitudinally extensible member which tends to urge it into an extended condition.

2. In a pull type implement having a transversely extending crop engaging means which is supported at its outer end by a support wheel, a draft frame which is adapted to connect the inner end of said implement to an associated draft vehicle and to support that end of said implement, said draft frame comprising a longitudinally extending, rigid framework which includes a unitary, rigidly attached, forwardly extending draw bar having a draft connection at its forward end for engaging a point on the draft vehicle, and a support wheel journalled on said framework adjacent its rearward end, a transversely extending member having its inner end attached to said framework intermediate said support wheel and said draft connection, a longitudinally extensible member connecting the outer end of said transversely extending member to a point on said draft vehicle which is spaced from the said point of connection of said drawbar, said connection between said longitudinally extensible member and said transversely extending member including a vertically extending pin connection, thereby permitting movement of said longitudinally extensible member in a horizontal plane, and resilient means associated with said longitudinally extensible member which tends to urge it into an extended condition.

NORMAN R. KRAUSE.

REFERENCES CITED

The following references are of record in the file of this patent:

UNITED STATES PATENTS

| Number | Name | Date |
|---|---|---|
| 2,311,859 | Oehler | Feb. 23, 1943 |